(12) United States Patent
Duan

(10) Patent No.: US 7,808,969 B2
(45) Date of Patent: Oct. 5, 2010

(54) VOICE OVER INTERNET PROTOCOL (VOIP) READY COMPUTER SYSTEM AND METHOD

(75) Inventor: Mark Xiaoming Duan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 11/149,625

(22) Filed: Jun. 10, 2005

(65) Prior Publication Data
US 2006/0291442 A1    Dec. 28, 2006

(51) Int. Cl.
H04L 12/28    (2006.01)
(52) U.S. Cl. .............. 370/351; 345/173; 348/14.01; 370/353; 370/395.52; 370/402; 379/368; 379/428.01; 381/74; 381/384; 455/41.1; 455/74.1; 455/554.1
(58) Field of Classification Search ................ 345/173; 348/14.01; 370/352, 353, 395.52, 401, 402; 379/368, 428.01; 381/74, 384; 455/41.1, 455/74.1, 554.1
See application file for complete search history.

(56) References Cited

U.S. PATENT DOCUMENTS 6,856,616 B1 * 2/2005 Schuster et al. ............ 370/352
2004/0030785 A1   2/2004 Katoh
2004/0109461 A1 * 6/2004 Suzuki et al. ............... 370/401
2005/0055202 A1   3/2005 Kunito et al.
2005/0123114 A1 * 6/2005 Trandal et al. .......... 379/201.01
2005/0207401 A1 * 9/2005 Gu et al. .................... 370/352
2005/0207432 A1 * 9/2005 Velez-Rivera et al. ....... 370/401
2005/0220083 A1 * 10/2005 Takeuchi ................... 370/352
2006/0062400 A1 * 3/2006 Chia-Chun ................. 381/74

* cited by examiner

Primary Examiner—Pankaj Kumar
Assistant Examiner—Lonnie Sweet

(57) ABSTRACT

A VoIP ready computer system includes a housing having an integrated audio communications device holder adapted to receive an audio communications device. The housing includes a portion adapted to contain processing circuitry operable to execute programs and a storage device coupled to the processing circuitry. The storage device stores a VoIP program and other general purpose programs for execution by the processing circuitry. An audio communications device is removably positioned in the audio communications device holder and is coupled to the processing circuitry. The audio communications device is operable to communicate audio signals during execution of the VoIP program.

21 Claims, 3 Drawing Sheets

(Background)

VOICE OVER INTERNET PROTOCOL (VOIP) READY COMPUTER SYSTEM AND METHOD

BACKGROUND OF THE INVENTION

Voice over Internet Protocol (VoIP) is a method of communicating voice or audio signals over the Internet and in this way enables a person to place phone calls over the Internet utilizing his or her computer system. FIG. 1 is a block diagram illustrating the components of a conventional VoIP system 100 that is formed by installing and configuring an external VoIP package 102 on a personal computer system 104. The external VO IP package 102 includes VoIP program or software 106 that is installed on the computer system 104 as indicated by the doffed line 108. A peripheral headset 110 in the package 102 is coupled to the computer system 104 through a suitable connection, such as through microphone input and speaker output connections on a conventional audio card (not shown) in the computer system. The computer system 104 is coupled to the Internet as indicated by a communications link 112 in FIG. 1.

In operation, a user purchases the VO IP package 102, installs the software 106 on the computer system 104, and connects the peripheral headset 110 to the computer system through the appropriate connection. Alternatively and probably more commonly, a user downloads the software 106 via the communication link 112 from a Web site of a VO IP service provider and separately purchases the peripheral headset 110. Once the software 106 has been installed, the user must configure the software to operate properly with the computer system 104 and establish an account with the VO IP service provider associated with the software 106.

While many users are comfortable downloading and installing software on their computer system 104, VoIP software 106 requires more extensive configuration than is typical with other types of programs, which are very simple to download, install, and run. As a result, many potential users are dissuaded from using VoIP software 106 due to the relatively difficult process of downloading and configuring such software to operate properly on the user's computer system 104. Users having technical backgrounds, such as engineers and scientists, may not be inhibited from utilizing such software 106 on their computer systems 104, but many other potential users are so inhibited by conventional VoIP software.

There is a need for a system and method of simplifying the process of implementing VoIP on a typical computer system.

SUMMARY OF THE INVENTION

According to one aspect of the present invention, a VoIP ready computer system includes a housing having an integrated audio communications device holder adapted to receive an audio communications device. The housing includes a portion adapted to contain processing circuitry operable to execute programs and a storage device coupled to the processing circuitry. The storage device stores a VoIP program and other general purpose programs for execution by the processing circuitry. An audio communications device is removably positioned in the audio communications device holder and is coupled to the processing circuitry. The audio communications device is operable to communicate audio signals during execution of the VoIP program.

DETAILED DESCRIPTION OF PREFERRED EMBODIMENTS

Figure 1:
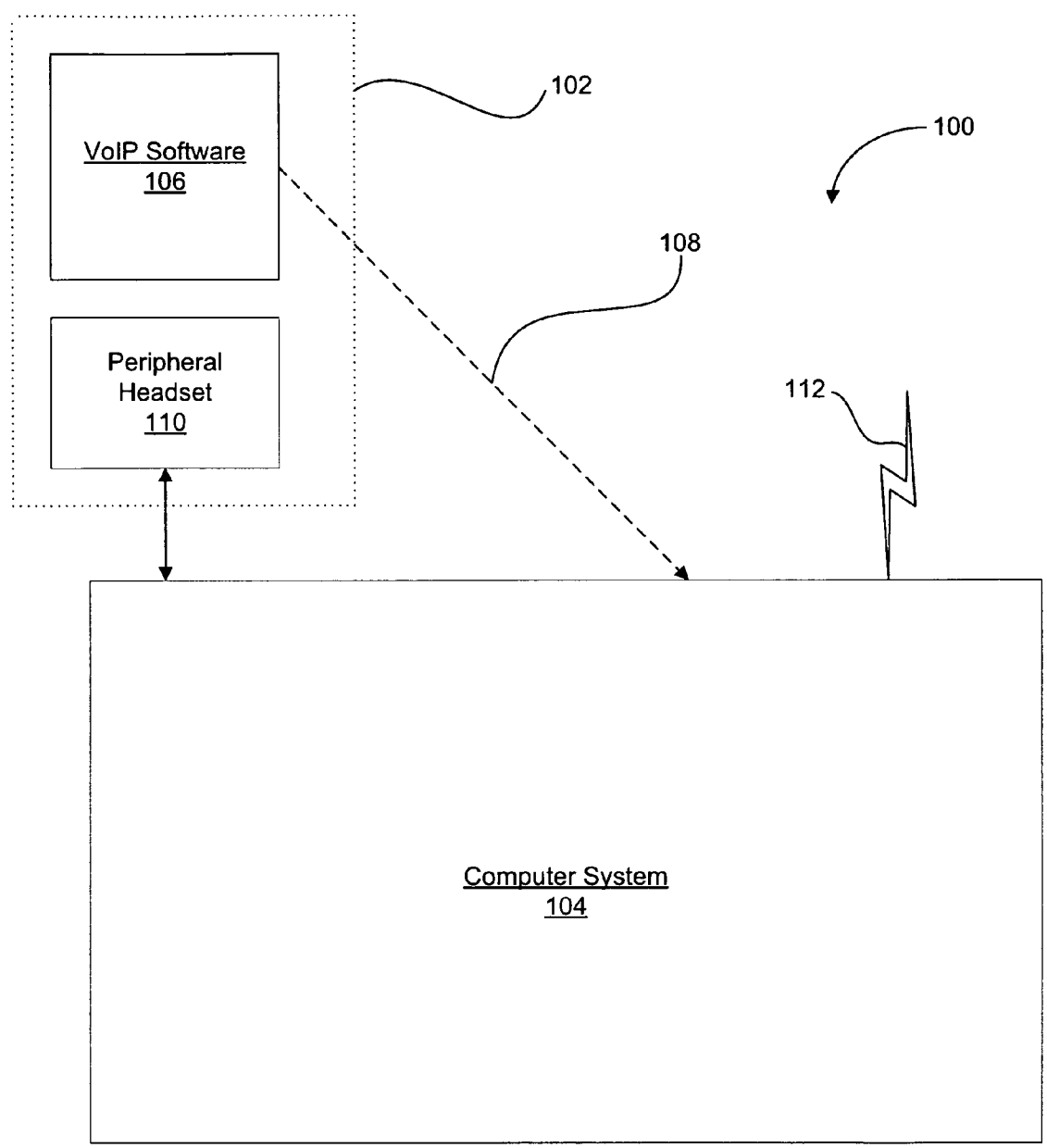
FIG. 1 is a block diagram illustrating the components of a conventional VoIP system formed by installing and configuring an external VoIP package on a personal computer system.
Figure 2:
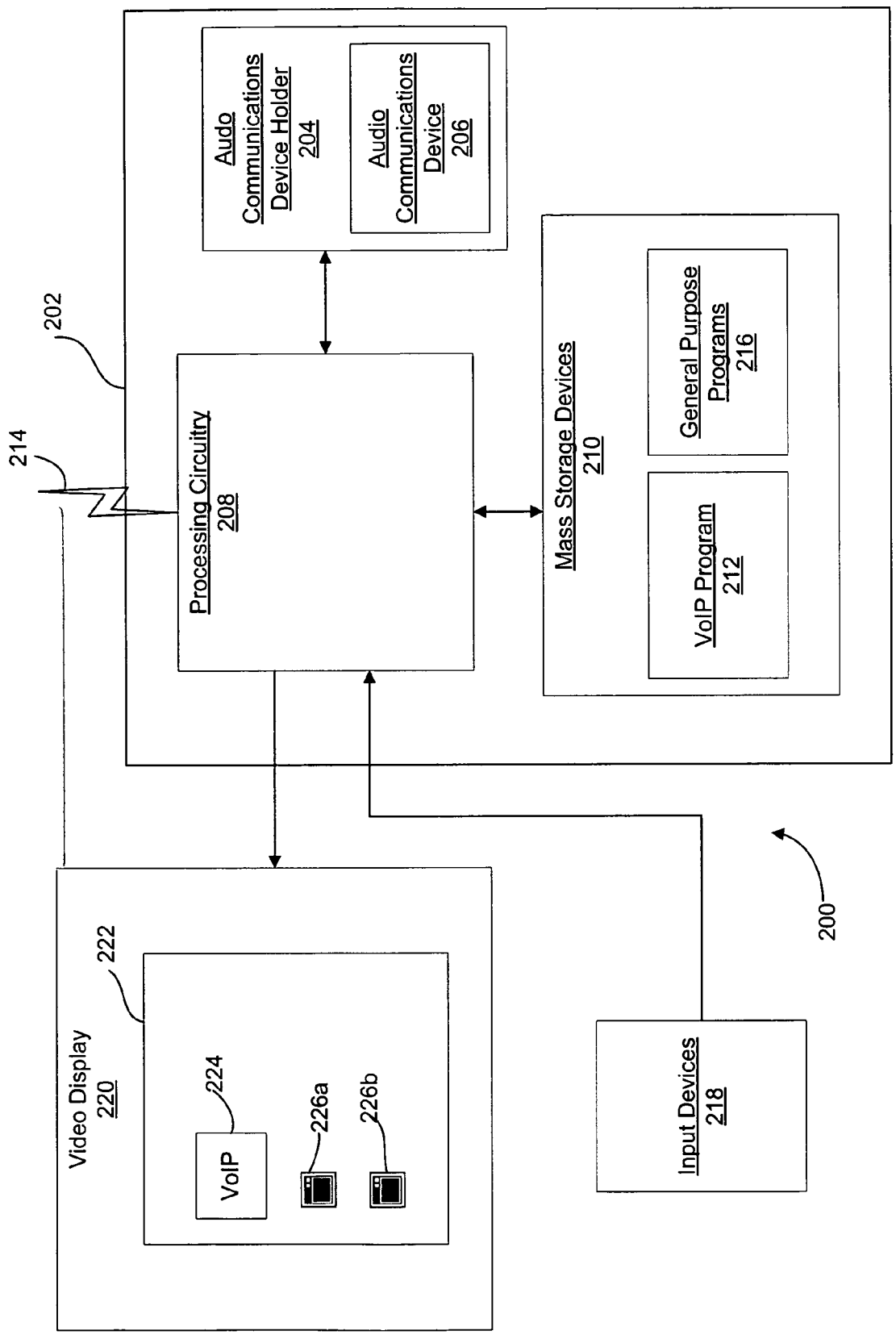
FIG. 2 is block diagram of a VoIP ready computer system according to one embodiment of the present invention.

FIG. 2 is block diagram of a VoIP ready computer system 200 according to one embodiment of the present invention. The VoIP computer system 200 includes a chassis or housing 202 having an audio communications device holder 204 that is an integrated part of the housing. The device holder 204 is formed so that an audio communications device 206 may be positioned in and removed from the holder. The audio communications device 206 is coupled to processing circuitry 208 contained in the housing 202 and the processing circuitry, in turn, is coupled to a mass storage device 210 on which a VoIP program 212 is preinstalled and configured to properly operate on the computer system 200. In operation, a user need merely purchase the computer system 200, couple the system through a communications link 214 to the Internet, and establish an account with a VoIP service provider (not shown) associated with the VoIP program 212, as will be described in more detail below. All configuration of the VoIP program 212 is done prior to purchase of the computer system 200 to ensure the program operates properly. The VoIP program may therefore be referred to as being preinstalled and the computer system 200 as being "VoIP ready" in the present description. This preinstallation eliminates the difficulties and should thereby eliminate the reluctance of many users to using VoIP programs 212. Moreover, the audio communications device 206 is an integrated part of the system 200, coming preconnected to the processing circuitry 208 and being contained in the integrated holder 204 when not in use. This allows for easy and convenient storage of the audio communications device 206 when not in use and also allows for easy access to the device for answering or placing phone calls using the computer system 200.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the operation of well known components and/or processes has not been shown or described in detail below to avoid unnecessarily obscuring the present invention.

The processing circuitry 208 includes circuitry for performing various computing functions, such as executing general purpose programs 216 like word processors, Web browsers, and spreadsheets to perform specific calculations or tasks. The processing circuitry 208 typically includes a microprocessor (not shown), associated chip set (not shown), and system memory (not shown) coupled to the microprocessor through the chip set. The system memory typically includes dynamic random access memory for storing portions of the programs 212 and 218 that are currently being executed by the processing circuitry 208.

The audio communications device 206 is coupled to the processing circuitry 208 through a suitable connection, such as an analog bus including signal lines for communicating analog audio signals to and from the device. The device 206 includes a receiving transducer or speaker (not shown) for converting received audio signals into sound and a transmitting transducer (not shown) for converting the voice of user speaking into the device into a corresponding analog audio signal. Alternatively, the device 206 may include additional circuitry such as an analog-to-digital converter for converting the analog audio signal from transmitting transducer into a digital signal and a digital-to-analog converter for converting a received digital signal into an analog audio signal that is applied to the speaker. In this situation, the device 206 is coupled to the processing circuitry 208 through a suitable digital bus like a universal serial bus (USB). In one embodiment, the device 206 is precoupled to the processing circuitry 208 to simplify initial set up steps required from the user to use the VoIP program 212. In this situation, the device 206 may be coupled to the processing circuitry 208 at a point internal to the housing 202 since there is really no reason to disconnect the device from the processing circuitry. Physically, the device 206 would typically be a handset similar a handset of a conventional telephone, but could also have alternative physical embodiments such as being a headset including speakers for a user's ears and a microphone extending in front of the user's mouth. Whatever specific physical form the device 206 takes, the holder 204 varies accordingly such that the holder provides a convenient place integrated into the housing 202 for storing the device when not in use.

The computer system 200 further includes one or more input devices 218, such as a keyboard or a mouse, coupled to the processing circuitry 208 to allow an operator to interface with the computer system. Typically, the computer system 200 also includes one or more output devices coupled to the processing circuitry 208, such output devices typically including a printer (not shown) and a video display 220. A desktop 222 displayed on the video display 220 is shown in FIG. 2 and will be discussed in more detail below in describing the initial steps performed by a user in establishing an account with a VoIP service provider. The mass storage devices 210 store data or retrieve data from external storage media (not shown) under control of the processing circuitry 208. Examples of typical mass storage devices 210 include hard and floppy disks, tape cassettes, compact disk read-only (CD-ROMs) and compact disk read-write (CD-RW) memories, and digital video disks (DVDs).

The overall construction of the system 200 and operation of the system by a user to place and receive VoIP calls will now be described in more detail. With the system 200, a manufacturer or some party other than the end user initially installs the VoIP program 212 on the system, including storing the program on the mass storage devices 210 and configuring the program for proper operation on the computer system. In one embodiment, part of this configuration includes placing a VoIP icon 224 on the desktop 222 or some other easily accessible screen that will be presented of the user upon power-up of the computer system 200. The VoIP icon 224 provides a link to an account activation form (not shown) for the VoIP service provider associated with the VoIP program 212. Along with installing the VoIP program 212, the audio communications device 206 is also coupled to the processing circuitry 208 at this point and the computer system 200 packaged for sale to an end user. The manufacturer may also test the proper operation of the device 206 and VoIP program 212 prior to packaging the computer system 200.

A purchaser then buys the computer system 200 and makes the usual required interconnections such as connecting the video display 220 and input devices 218 to the processing circuitry 208. At this point, the purchaser turns on the computer system 200 and inputs initial setup information like naming the computer system 200. The video display 220 then displays the desktop 222 including the VoIP icon 224 along with other icons, two of which in the form of icons 226a and 226b are shown in FIG. 2. To set up an account with the VoIP service provider associated with the VoIP program 212, the purchaser at this point double clicks on the VoIP icon 224. Recall, the VoIP icon 224 provides a link to an account activation form (not shown) for the VoIP service provider associated with the VoIP program 212. The purchaser at this point inputs required information to establish an account with the VoIP service provider, such as providing name, address, and billing information. The account activation form would typically include one or more Web pages that allow the purchaser to enter this personal information and thereby establish an account with a VoIP service provider associated with the VoIP program 212.

Once the purchaser has completed the steps, the computer system 200 is ready to use for placing and receiving VoIP telephone calls. The specific operation of the system 200 in placing and receiving such calls depends upon the specific VoIP program 212 installed in the system, and thus, for the sake of brevity, the details of this operation will not be described in more detail. Generally, to initiate or place a call the purchaser interfaces with the VoIP program 212 and then picks up the audio communications device 206 from the device holder 204 and talks into and listens with the device. To receive a call, the VoIP program 212 notifies the purchaser of the incoming call in the purchaser then makes an appropriate response through one of the input devices 218 and picks up the audio communications device 206 from the device holder 204 and again talks into and listens with this device. Note that in one embodiment, to answer a call the communications device 206 or the holder 204 include circuitry allowing the purchaser to merely pick up the device when notified of the incoming call to thereby answer the call as with a conventional telephone. Moreover, in this embodiment the system 200 could be configured so that upon the audio communications device 206 being activated (e.g., picked up or picked up and an ON button pressed) by a user for the first time, the computer system displays the account activation form on the video display 220.

Figure 3:
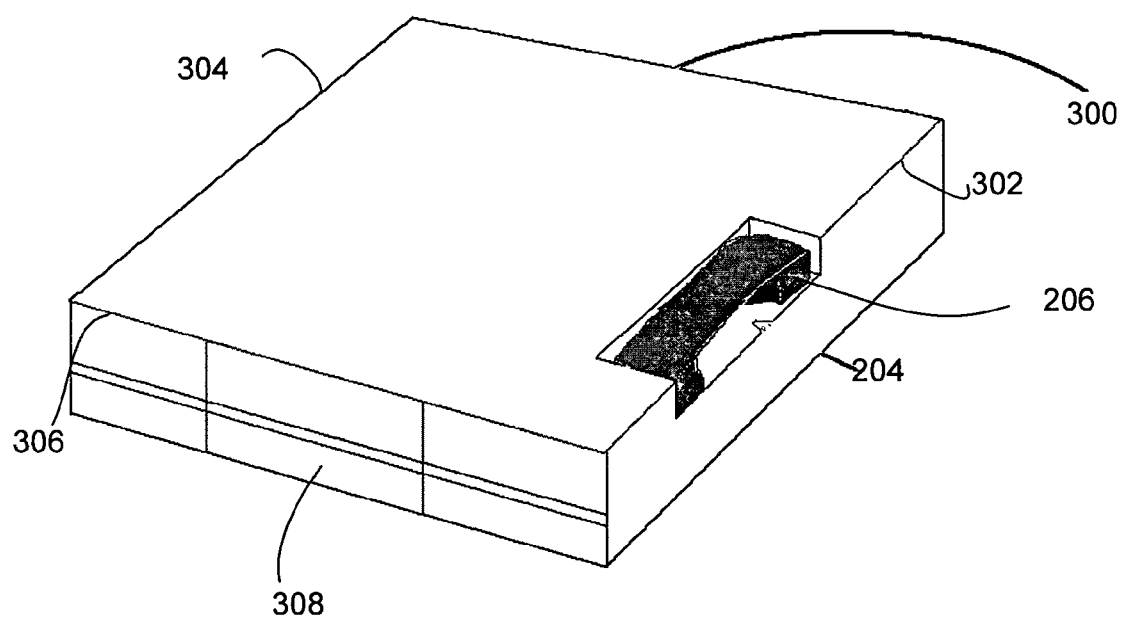
FIG. 3 is a more detailed three-dimensional view of the computer housing of FIG. 2 including an integrated handset holder and handset according to one embodiment of the present invention.

FIG. 3 is a more detailed three-dimensional view of the computer chassis or housing 202 of FIG. 2 according to one embodiment of the present invention. In the embodiment of FIG. 3, the audio communications device holder 204 is a rectangular recessed portion formed in a top panel 300 of the housing 202. The specific location of the rectangular recessed portion 204 in the top panel 300 may, of course, vary, with the recessed portion being formed long a right edge 302 of the top panel 300 in the embodiment of FIG. 3. In other embodiments, the recessed portion 204 is located in a different location of the top panel 300, such as along a left edge 304 or along a front edge 306 of the top panel. Wherever the recessed portion 204 is formed in the top panel 300, the recessed portion is an integral part of the housing 202.

The recessed portion 204 could be a stamped out portion of the top panel 300 or could be a separate rectangular shaped box piece that fits into a cutout in the top panel. Also note that the recessed portion 204 need not be formed in the top panel 300, but could instead be formed elsewhere in the housing 202 such as in a front panel 308. Furthermore, the device holder 204 need not be a recessed portion, but could alternatively be a component extending from one of the panels of the housing 202. In one embodiment, a connector (not shown) for connecting the communications device 206 to the processing circuitry 208 is exposed along one of the sides of the recessed portion 204, allowing a user to plug the device 206 into the connector as part of the initial process of interconnecting all components of the system 200 (FIG. 2). Alternatively, this connector need not be exposed within the holder 204 but instead may be inside the housing 202 and accessible only by disassembling the housing to expose the processing circuitry 208 (FIG. 2).

With the VoIP ready computer system 200, a user need merely purchase the computer system and establish an account with a VoIP service provider associated with the VoIP program 212, assuming the system is connected to the Internet. All installation and configuration of the VoIP program 212 is done prior to purchase of the computer system 200 to ensure the program operates properly. This makes the system 200 more user-friendly for non-technical users and should eliminate the reluctance of many such users to using VoIP programs 212. Also note the integrated nature of the holder 204 and device 206, being part of housing and coming connected to the processing circuitry 208, respectively, allow for easy and convenient storage of the audio communications device 206 when not in use and also allows for easy access to the device for answering or placing calls.

One skilled in the art will understood that even though various embodiments and advantages of the present invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Moreover, the functions performed by components in the system 200 of FIG. 2 can be combined to be performed by fewer elements, separated and performed by more elements, or combined into different functional blocks depending upon the design of the system, as will appreciated by those skilled in the art. Therefore, the present invention is to be limited only by the appended claims.

What is claimed is:

1. VoIP ready general purpose computer system, comprising:
   a housing including an integrated audio communications device holder adapted to receive an audio communications device and the housing including a portion adapted to contain,
   processing circuitry operable to execute programs in the general purpose computer system, the processing circuitry located within the housing and adapted to operably connect to a computer network;
   a storage device coupled to the processing circuitry, the storage device storing a preinstalled VoIP program and configured to receive and store general purpose programs for execution by the processing circuitry of the general purpose computer system wherein the general purpose programs include a web browser and at least one of a word processor and a spread sheet that are distinct from the VoIP program;
   whereupon connection to the computer network, the VoIP program is adapted to initiate access through the web browser to a preselected VoIP account on the computer network to facilitate communication with the VoIP program; and
   an audio communications device removably positioned in the audio communications device holder and coupled to the processing circuitry, the audio communications device operable to communicate audio signals during execution of the VoIP program.

2. The computer system of claim 1 wherein the audio communications device comprises a handset.

3. The computer system of claim 1 wherein the audio communications device comprises a headset.

4. The computer system of claim 1 wherein the housing includes a top having edges and having a recessed portion along one of the edges, wherein the recessed portion corresponds to the audio communications device holder.

5. The computer system of claim 4 wherein the recessed portion in the top of the housing is a rectangular block shaped portion.

6. The computer system of claim 1 wherein the processing circuitry comprises a microprocessor coupled to a system memory that is operable to store portions of a program being executed by the processing circuitry.

7. The computer system of claim 1 further comprising input devices coupled to the processing circuitry.

8. The computer system of claim 7 wherein the input devices include a keyboard and a mouse, and further including an optical disc reader coupled to processing circuitry and mechanically coupled to the housing.

9. The computer system of claim 1 further including output devices coupled to the processing circuitry.

10. The computer system of claim 9 wherein the output devices include a video display.

11. The computer system of claim 1 wherein the audio communications device is coupled to the processing circuitry through an analog bus.

12. The computer system of claim 1 wherein the audio communications device is coupled to the processing circuitry through a digital communications bus and wherein the device includes analog-to-digital and digital-to-analog converters.

13. The computer system of claim 1 wherein the processing circuitry includes a connector not accessible externally when the housing is assembled and wherein the audio communications device is coupled to the processing circuitry through this connector.

14. A VoIP ready general purpose computer system, comprising:
   processing circuitry operable to execute a preinstalled VoIP program that has been configured to operate properly on the general purpose computer system wherein the processing circuitry is configured to receive and execute general purpose programs including a word processor and a spread sheet distinct from the VoIP program;
   wherein the VoIP program is configured to automatically connect to a remote and preselected VoIP account on a computer network upon initial user activation of the processing circuitry;
   a removable storage-medium reader coupled to the processing circuitry;
   a chassis including an integrated holder adapted to receive an audio communications device, the processing circuitry being contained within the chassis and the reader mechanically coupled to the chassis; and an audio communications device coupled to the processing circuitry and to the VoIP program, and adapted to be removably positioned in the holder.

15. The computer system of claim 14 wherein the audio communications device comprises a handset.

16. The computer system of claim 14 wherein the housing includes a top portion having edges and having a recessed portion formed along one of the edges, wherein the recessed portion corresponds to the holder.

17. The computer system of claim 14 wherein the processing circuitry comprises a microprocessor coupled to a system memory and coupled to a mass storage device that stores the preinstalled VoIP program.

18. The computer system of claim 14 further comprising additional input devices and output devices coupled to the processing circuitry.

19. A method of communicating audio signals over a digital communications network using a general purpose computer system, the method comprising:

supplying power to the general purpose computer system configured to include a pre-installed communications program and general purpose programs including a web browser, a word processor, and a spreadsheet;

coupling the computer system to the digital communications network;

without installing any additional software on the computer system, clicking on an icon displayed on the computer system wherein the communications program initiates access over the digital communications network to a preselected VoIP account;

rendering an account activation form on the computer system with the web browser;

supplying customer account information in response to the account activation form; and using the computer system to communicate audio signals over the network.

20. The method of claim 19 wherein the account activation form includes one or more Web pages that allow a user to enter personal information to establish an account with a VoIP service provider associated with VoIP software preinstalled on the computer system.

21. The method of claim 19 where the digital communications network includes the Internet.

* * * * *